United States Patent [19]

Okushita

[11] Patent Number: 5,618,253
[45] Date of Patent: Apr. 8, 1997

[54] HEAT-SEALING METHOD FOR A PAPER CONTAINER AND APPARATUS OF THE SAME

[75] Inventor: Masataka Okushita, Tokyo-To, Japan

[73] Assignee: Dai Nippon Printing Co., Ltd., Japan

[21] Appl. No.: 397,191

[22] PCT Filed: Jul. 13, 1994

[86] PCT No.: PCT/JP94/01144

§ 371 Date: May 1, 1995

§ 102(e) Date: May 1, 1995

[87] PCT Pub. No.: WO95/02540

PCT Pub. Date: Jan. 26, 1995

[30] Foreign Application Priority Data

Jul. 13, 1993 [JP] Japan ................................. 5-172873

[51] Int. Cl.⁶ .................................................. B31B 1/64
[52] U.S. Cl. ........................... 493/134; 493/184; 53/477; 53/370.9
[58] Field of Search ................... 53/477, 370.9, 53/370.8, 373.9, 373.8, 585; 493/133, 134, 135, 165, 184

[56] References Cited

U.S. PATENT DOCUMENTS

| | | | |
|---|---|---|---|
| 3,566,762 | 3/1971 | Vadas | 53/370.9 |
| 3,724,093 | 4/1973 | Olila | 493/134 |
| 3,789,746 | 2/1974 | Martensson et al. | 493/134 |
| 3,824,702 | 7/1974 | Farfaglia | 493/184 |
| 3,825,408 | 7/1974 | Farfaglia | 493/134 |
| 3,890,765 | 6/1975 | Farfaglia | 53/183 |
| 4,590,740 | 5/1986 | Rodocker | 53/426 |
| 4,738,077 | 4/1988 | Wakbayashi et al. | 53/375 |
| 4,838,009 | 6/1989 | Conner et al. | 53/477 |
| 5,120,292 | 6/1992 | Ueda et al. | 493/134 |
| 5,230,204 | 7/1993 | Hall et al. | 493/134 |

FOREIGN PATENT DOCUMENTS

| | | | |
|---|---|---|---|
| 000649207 | 6/1993 | Australia | 53/370.9 |
| 54-5758 | 3/1979 | Japan . | |
| 57-96903 | 6/1982 | Japan . | |
| 63-41301 | 10/1988 | Japan . | |
| 2-99709 | 8/1990 | Japan . | |
| 3-25463 | 4/1991 | Japan . | |
| 5-131572 | 5/1993 | Japan . | |
| 6-80124 | 3/1994 | Japan . | |

*Primary Examiner*—Joseph J. Hail, III
*Assistant Examiner*—Christopher W. Day
*Attorney, Agent, or Firm*—Parkhurst, Wendel & Burr, L.L.P.

[57] ABSTRACT

An inner seal portion (30a) of an open edge portion (1a, 1b) of a paper container (1) is aligned face-to-face with an inner peripheral heating portion of a seal-heating apparatus. An outer seal portion (30b) of the open edge portion is aligned face-to-face with an outer peripheral heating portion (4, 5, 6, 7, 13, 14, 15, 16) of the seal-heating apparatus. At least the inner peripheral heating portion (8, 17) is oscillated about an axial line thereof so as to vary the hitting position of the inner seal portion against which hot air blown from the hot air blowing holes (8a) of the inner peripheral heating portion (8) hits. Thus, the seal portion (30) of the paper container (1) can be equally and properly heated.

10 Claims, 6 Drawing Sheets

HEAT-SEALING METHOD FOR A PAPER CONTAINER AND APPARATUS OF THE SAME

TECHNICAL FIELD

The present invention relates to a heat sealing method for a paper container and an apparatus for heating seal portions of open edge portions such as a top edge portion and a bottom edge portion to bond the open edge portions and assemble a paper container. The present invention is applicable to all technical fields in which containers are filled with substances, particularly containers filled with liquid such as soft drinks or alcoholic drinks.

RELATED ART

Generally, closed paper containers which are filled with liquids such as soft drinks and alcoholic drink have been widely used.

The paper container is formed in the following manner. A plane paper material is folded in a cylinder shape to form the paper container. A bottom edge portion of the container is heated by a heating apparatus. Next, the bottom edge portion is folded along fold lines, and then the heated portion is press-bonded so as to form a bottom portion.

Thereafter, the paper container is filled with a predetermined liquid. A top edge portion which has fold lines is heated by the heating apparatus, and then the folded portion of the top edge portion is press-bonded. Thus, the contents of the paper container is sealed within the container.

The conventional heating apparatus which heats the edge portions of the paper container comprises a plane side heating portion, a folded side heating portion, and a hexagonal inner peripheral heating portion. The plane side heating portion heats two flat sides of the top edge portion of the container. The folded side heating portion heats two folded sides with fold lines of the top edge portion. The hexagonal inner peripheral heating portion heats entire inner walls of the top edge portion.

Many hot air blowing small holes are formed at predetermined portions of the flat side heating portion, the folded side heating portion, and the inner peripheral heating portion. Thus, hot air is blown from the many hot air blowing small holes to predetermined portions of the front and rear surfaces of the top edge portion.

Thus, according to the conventional heating apparatus, since hot air is blown from each hot air blowing small hole, the top edge portion of the paper container is locally heated. When the paper container is composed of a laminate of resin, aluminum foil, paper, resin, and so forth, heat is easily disfused since the aluminum has high heat conductivity. However, when the temperature of hot air is high, foams, burns, or pin holes result on the heated portion of the container.

When the paper container is composed of a laminate of resin, glass evaporation layer, paper, resin, and so forth, the portion exposed to hot air is locally heated since the glass evaporation layer has low heat conductivity. At this portion, therefore, foams, burns and pin holes tend result.

In addition, positions of the four inner corners of the top edge portion of the container vary for each paper container due to the difference of size and fold lines. Thus, the amount of hot air blown to the four inner corners varies for each paper container. Accordingly when the material is folded and pressed, seal defects will occur and the contents will leak out of the paper container.

Likewise, such problems occur in an apparatus which has many hot air blowing small holes blowing hot air toward the bottom edge portion of the paper container.

DISCLOSURE OF THE INVENTION

The present invention overcomes the above-described problems. An object of the present invention is to provide a seal-heating method for a paper container and apparatus for the same, for press-bonding the top edge portion or the bottom edge portion with hot air blown from hot air blowing small holes without occurrences of foams, burns, and pin holes and for equally and properly heating portions in the vicinity of four inner corners of the edge portions.

A first aspect of the present invention is a seal-heating method for a paper container using a seal-heating apparatus, comprising the steps of facing an inner seal portion of a seal portion formed at an open edge portion of a cylindrically shaped paper container which has not been assembled to an inner peripheral heating portion of the seal-heating apparatus and facing an outer seal portion of the seal portion to an outer peripheral heating portion of the seal-heating apparatus, and blowing hot air from hot air blowing small holes formed at the inner peripheral heating portion to the inner seal portion while oscillating the inner peripheral heating portion and blowing hot air from hot air blowing small holes formed at the outer peripheral heating portion to the outer seal portion.

A second aspect of the present invention is a seal-heating apparatus for a paper container, for seal-heating a cylindrically shaped paper container, comprising an inner peripheral heating portion oscillatably disposed, facing an inner seal portion of a seal portion formed at an open edge portion of the paper container which has not been assembled and having hot air blowing small holes from which hot air is blown to the inner seal portion, an outer peripheral heating portion facing an outer seal portion of the seal portion and having hot air blowing small holes from which hot air is blown to the outer seal portion, and an oscillating device for oscillating the inner peripheral heating portion.

According to the first aspect of the present invention, since the inner peripheral heating portion is oscillated, the direction of the hot air blown from the hot air blowing small holes can be varied to prevent the hot air from directly flowing to the inner seal portions. Thus, the inner seal portions can be equally, fully, and properly heated.

According to the second aspect of the present invention, since the inner peripheral heating portion is oscillated by the oscillating device, the direction of hot air blown from the many hot air blowing small holes formed in the inner peripheral heating portion can be varied to prevent hot air from flowing to limited points of the inner seal portions. Thus, the entire inner seal portions can be equally and properly heated.

DETAILED DESCRIPTION OF THE INVENTION

For easily understanding the function of the present invention, first of all, a conventional seal-heating method for a paper container and apparatus of the same will be described.

Figure 6:
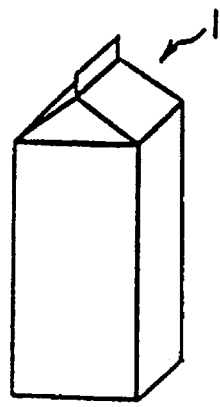
FIG. 6 is an overall perspective view showing a conventional paper container.

Generally, as a closed paper container which is filled with a soft drink or alcoholic drink, for example, a paper container 1 shown in FIG. 6 has been used.

Figure 7:
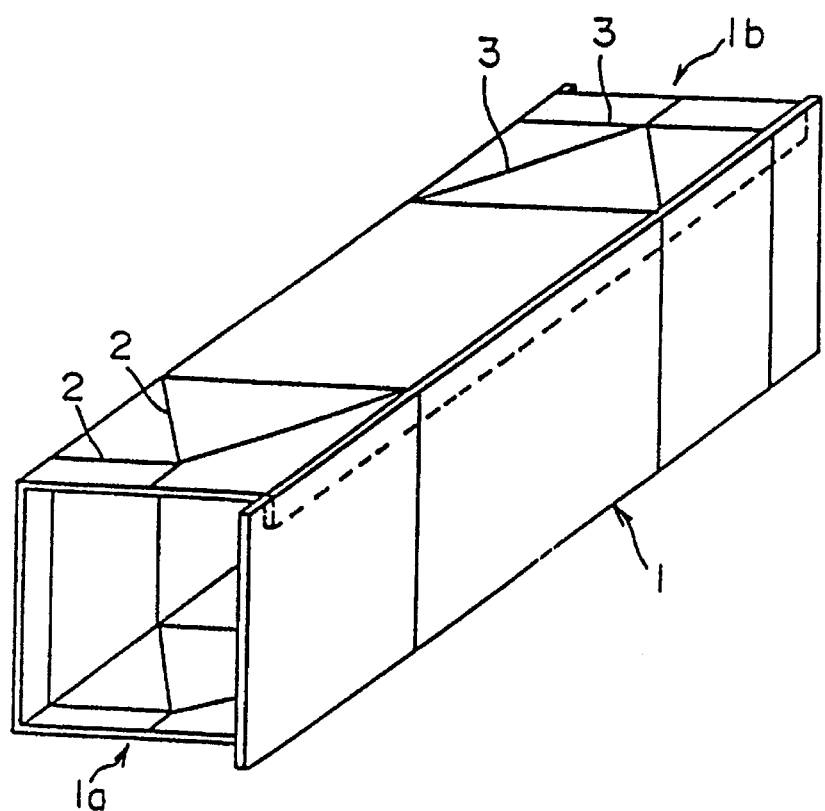
FIG. 7 is a perspective view showing a paper container in which body portions have been raised before assembled.

The paper container 1 is formed in a cylinder shape as shown in FIG. 7. First, an open edge portion 1a of the paper container 1 is heated by a seal-heating apparatus. Next, the edge portion 1a is folded along fold lines 2, and then the heated portion is press-bonded. Thus, a bottom portion of the paper container 1 is formed.

Figure 8:
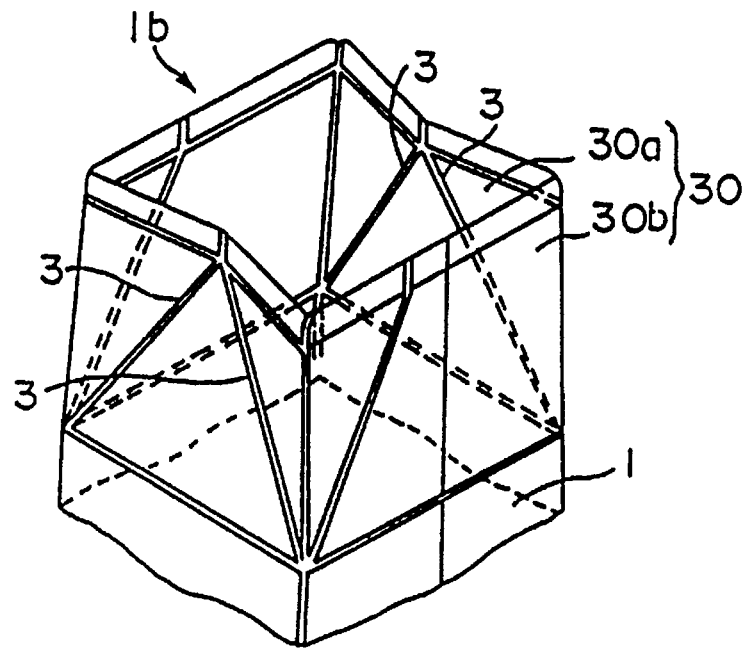
FIG. 8 is a perspective view showing the top edge portion of the paper container that has been folded before assembled and heated.

Next, as shown in FIG. 8, the paper container 1 having the bottom portion is filled with a desired liquid. Thereafter, an open top edge portion 1b of the paper container 1 which has fold lines 3 is heated by the seal heating apparatus. Next, the top edge portion 1b is folded and press-bonded. Thus, the paper container 1 as shown in FIG. 6 is formed.

Figure 9:
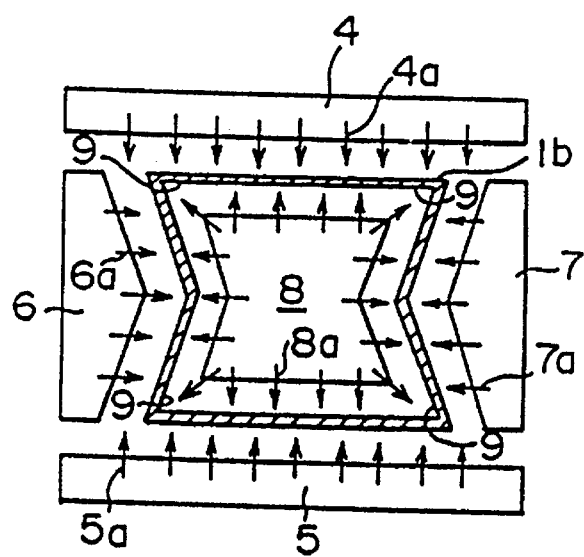
FIG. 9 is a schematic diagram showing the seal heating apparatus for the top edge portion of the paper container.

Conventionally, as a heating apparatus that heats the open edge portions of the above-described paper container 1, a seal heating apparatus for a top edge portion as shown in FIG. 9 has been used. The seal heating apparatus for the top edge portion comprises flat side heating portions 4 and 5, folded side heating portions 6 and 7, and a hexagonal inner peripheral heating portion 8. The flat side heating portion 4 and 5 heat the flat sides of the top edge portion 1b of the paper container 1. The folded side heating portions 6 and 7 heat the two folded sides with fold lines of the top edge portion 1b. The hexagonal inner peripheral heating portion 8 heats the inner walls of the top edge portion 1b. The shape of the hexagonal inner peripheral heating portion 8 corresponds to the shape of the top edge portion 1b with the fold lines.

The flat side heating portions 4 and 5, the folded side heating portions 6 and 7, and the inner peripheral heating portion 8 have many hot air blowing small holes 4a, 5a, 6a, 7a, and 8a, respectively. The hot air blowing small holes 4a, 5a, 6a, 7a, and 8a blow hot air to predetermined portions of the front and rear surfaces of the top edge portion to heat the top edge portion 1b.

The present invention is an improvement of such a paper container seal-heating method and apparatus. Next, with reference to FIGS. 1 to 5, the present invention will be described in detail.

In the following description, the same portions as those shown in FIGS. 7 to 9 are depicted by the same reference numerals and their detail description is therefore omitted.

Figure 1:
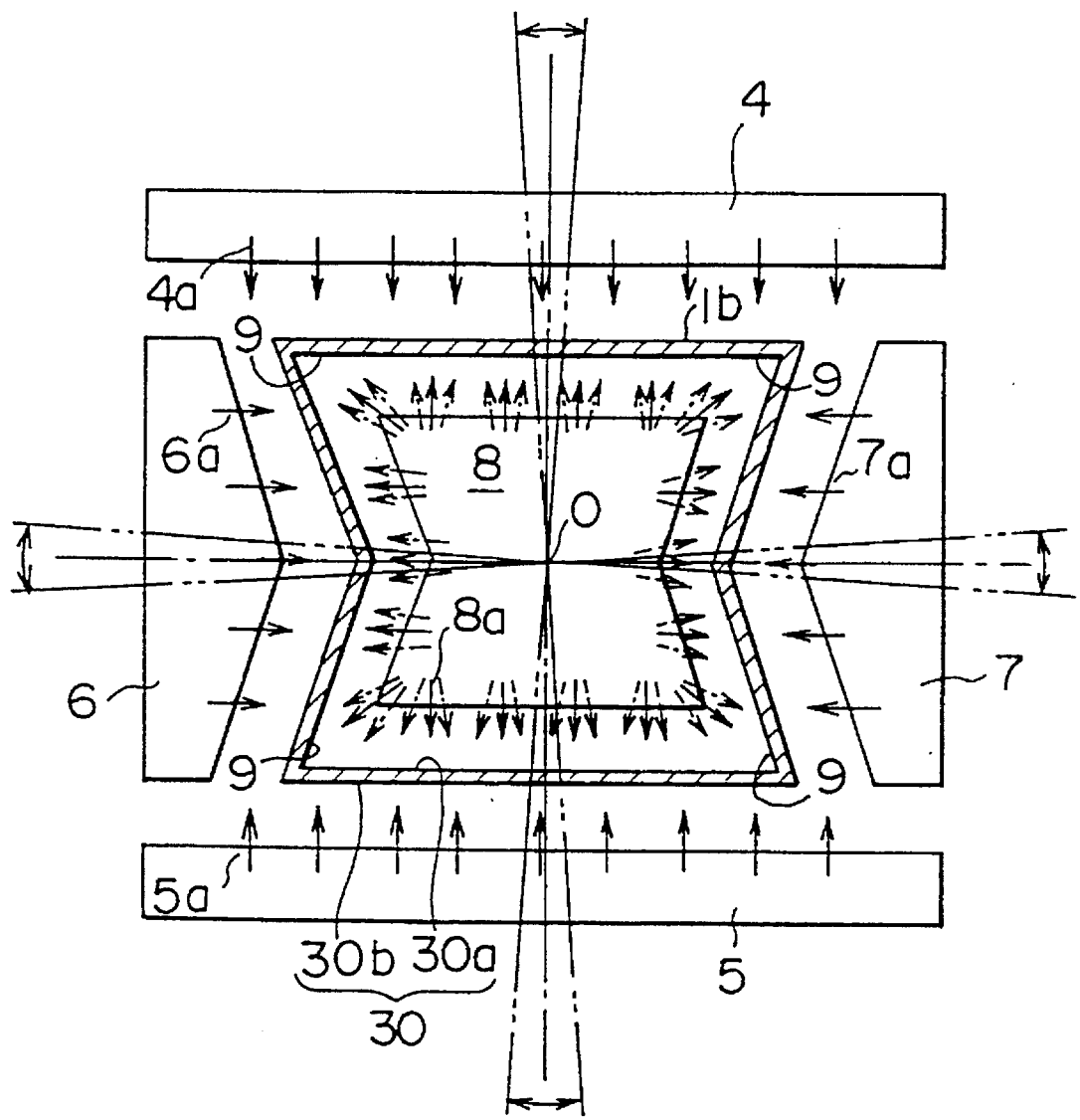
FIG. 1 is a schematic diagram for explaining a paper container seal heating method and apparatus according to an embodiment of the present invention.
Figure 2:
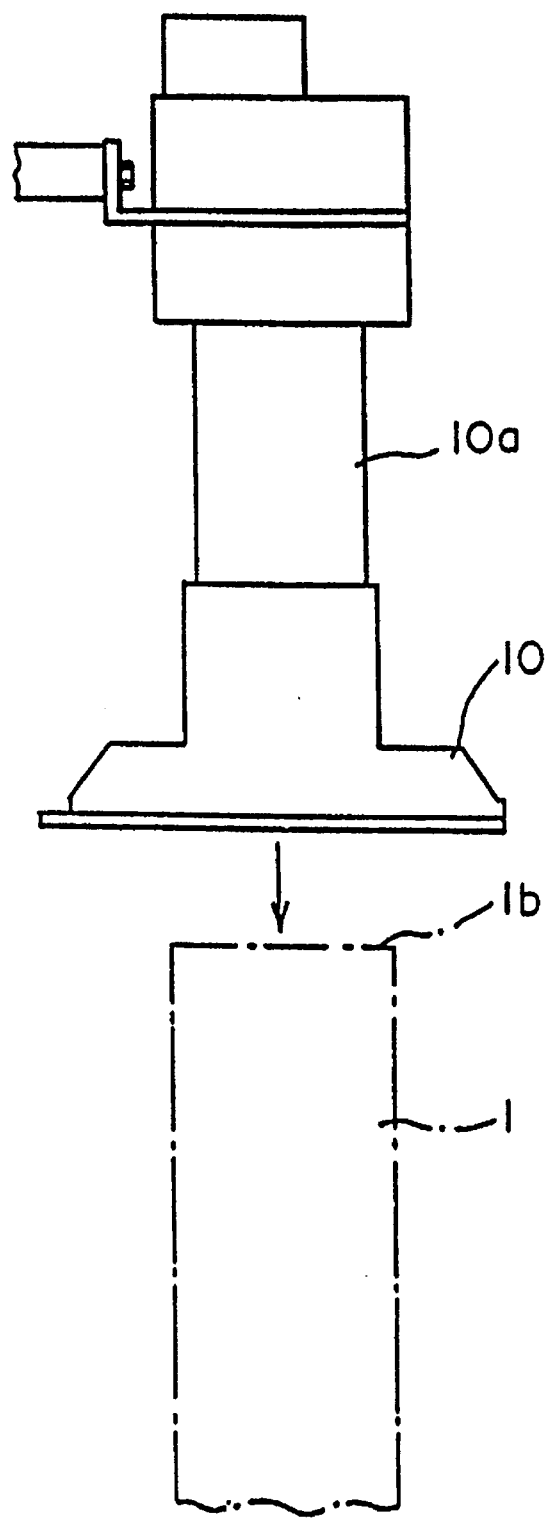
FIG. 2 is a front view showing a seal heating apparatus for a top edge portion according to the embodiment of FIG. 1.

FIG. 1 is a schematic diagram for explaining a seal-heating apparatus for a top edge portion of a paper container. FIG. 2 is a front view showing principal portions including the seal-heating apparatus. In FIGS. 1 and 2, reference numeral 1 represents a paper container. Reference numeral 1b represents a top edge portion. Reference numerals 4 and 5 represent flat side heating portions. Reference numerals 6 and 7 represent folded side heating portions. Reference numeral 8 represents an inner peripheral heating portion. Reference numeral 10 represents a chamber portion of the seal heating apparatus.

The seal-heating apparatus comprises the flat side heating portions 4 and 5, which heat two flat sides of the top edge portion 1b, the folded side heating portions 6 and 7, which heat two folded sides having fold lines of the top edge portion 1b, the hexagonal inner peripheral heating portion 8, which heats the entire periphery of the inner walls of the top edge portion 1b and whose shape corresponds to the shape of the top edge portion 1b with the fold lines, and chamber portion 10, which accommodates the heating portions 4, 5, 6, 7, and 8.

The chamber portion 10 accommodates the heating portions 4, 5, 6, 7, and 8, as mentioned above, and is coaxially lowered to and raised from the paper container 1 so that the chamber portion 10 covers the top edge portion 1b of the paper container 1 and is separated therefrom. The operation of the chamber portion 10 with respect to the paper container 1 can be performed by relatively moving the paper container 1 and the chamber portion 10. Thus, it should be noted that the top edge portion 1b of the paper container 1 may be raised and lowered with respect to the chamber portion 10. Hot air heated at a predetermined temperature is supplied from a hot air supply portion (not shown) in an apparatus main body 10a, and then is blown from the hot air blowing small holes 4a, 5a, 6a, 7a, and 8a of the flat side heating portion 4 and 5, the folded side heating portions 6 and 7, and the inner peripheral heating portion 8 to predetermined positions of the top edge portion 1b.

In other words, seal portion 30 to be bonded are formed at the open top edge portion 1b of the paper container 1. The seal portion 30 is composed of inner seal portion 30a and outer seal portion 30b. The inner seal portion 30a are formed on an inside surface of the top edge portion 1b. The outer seal portions 30b are formed on an outside surface of the top edge portion 1b (see FIGS. 1 and 8). When the chamber portion 10a is placed on the top edge portion 1b, the outer seal portion 30b faces to the flat side heating portions 4 and 5 and the folded side heating portions 6 and 7. The inner seal portion 30a faces to the inner peripheral heating portion 8. The flat side heating portions 4 and 5 and the folded side heating portions 6 and 7 compose outer peripheral heating portions.

The hot air blowing small holes 4a, 5a, 6a, 7a, and 8a are small round holes with diameters ranging from 0.4 mm to 2 mm and formed at pitches of 1 mm to 10 mm. If necessary, the hot air blowing small holes 4a, 5a, 6a, 7a, and 8a may be formed in a plurality of rows.

According to the present invention, the inner peripheral heating portion 8 having the hot air blowing small holes 8a can be oscillated. In other words, as shown in FIG. 1, the inner peripheral heating portion 8 can be oscillated on the plane perpendicular to the center axial line of the inner peripheral heating portion 8 with an oscillating angle ranging from around 0.3 deg. to 10 deg.

Figure 5A:
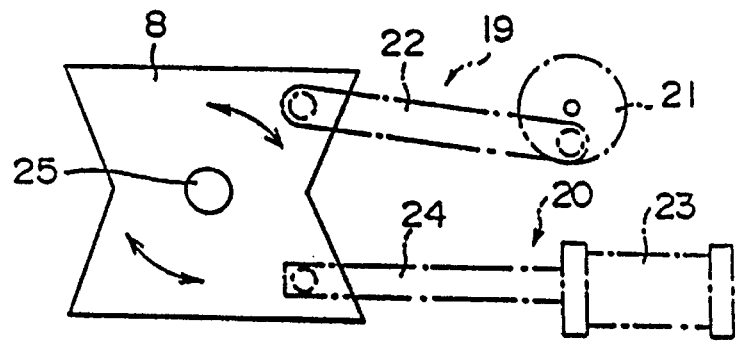
FIG. 5A is a schematic diagram showing an oscillating device.

The inner peripheral heating portion 8 is oscillated by a first oscillating portion 19 or 20 shown in FIG. 5A. In other words, the inner peripheral heating portion 8 is oscillated in arrow directions by the first oscillating portion 19 or 20. The inner peripheral heating portion 8 is pivoted by a shaft portion 25. The first oscillating portion 19 or 20 is connected to the outer peripheral side of the inner peripheral heating portion 8.

The first oscillating portion 19 has a slider crank mechanism. One edge of a link rod 22 of the slider crank mechanism is pivoted to an outer peripheral portion of a disc 21 of the slider crank mechanism that is rotated. The other edge of the link rod 22 is pivoted to the outer peripheral portion of the inner peripheral heating portion 8. Thus, the inner peripheral heating portion 8 can be oscillated in the arrow directions in accordance with the rotation of the disc 21 (FIG. 5A).

The other first oscillating portion 20 has a linear reciprocal moving mechanism that is driven by a solenoid. An edge portion of a drive lever 24 of the linear reciprocal moving mechanism connected to a solenoid main body 23 is pivoted to an outer peripheral portion of the inner peripheral heating portion 8.

By an electric operation of the solenoid main body 23, the drive lever 24 is reciprocally moved. Thus, the inner peripheral heating portion 8 is oscillated in the arrow directions (FIG. 5A).

It can be understood that either the first oscillating portion 19 or 20 may be used. In addition, any other oscillating operating means capable of performing the described angular movement may be used.

The period of the oscillating movement of the inner peripheral heating portion 8 is in a range from 1 Hz to 20 kHz.

Thus, as denoted by a single-dotted line of FIG. 1, the direction of the hot air blown from the hot air blowing small holes 8a of the inner peripheral heating portion 8 periodically varies. Consequently, the area of hot air blown from the hot air blowing small holes 8a is enlarged. In addition, the hot air can equally and properly heat the enlarged area. As a result, even if the paper container has a glass evaporation layer, it can be properly heated. Hitting position of the inner seal portion 30a against which the hot air blown from the hot air blowing small holes 8a hits, is moved in a straight locus.

In particular, the hot air is equally and properly blown to four inner corners 9 of the paper container 1.

The oscillating operation of the inner peripheral heating portion 8 is not limited to the above-described one in which the hitting position of the inner seal portion 30a is moved in a straight locus. Instead, the hitting position of the inner seal portion may be moved in a circle locus or an oval locus.

Figure 5B:
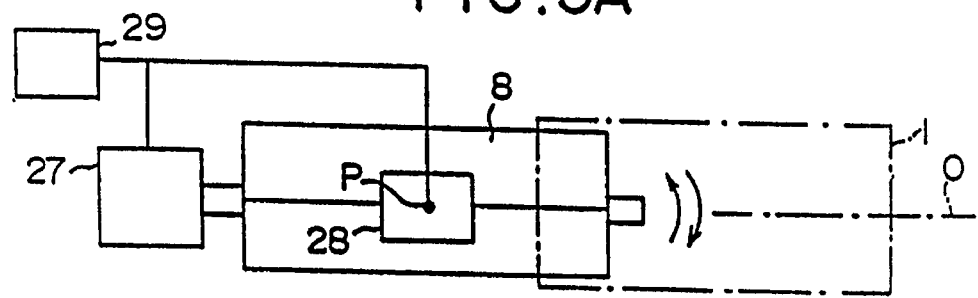
FIG. 5B is a schematic diagram showing another oscillating device.

In other words, as shown in FIG. 5B, the inner peripheral heating portion 8 may be oscillated not only about the axial line 0 thereof, but also about an perpendicular line P perpendicular to the axial line 0. In this case, the inner peripheral heating portion 8 is oscillated about the axial line 0 by the first oscillating portion 27. In addition, the inner peripheral heating portion 8 is oscillated about the perpendicular line P perpendicular to the axial line 0 by a second oscillating portion 28. The first and second oscillating portions 27 and 28 are connected to a control device 29. The first and second oscillating portions 27 and 28 are controlled by the control device 29. The control device 29 controls a moving amount X of the hitting position of the inner seal portion 30a against which the hot air hits where the inner peripheral heating portion 8 oscillates about the axial line 0. At the same time, the control device 29 controls a moving amount Y of the hitting position of the inner seal portion 30a against which the hot air hits where the inner peripheral heating portion 8 oscillates about the perpendicular line P.

For example, when the moving amount $X=\gamma \sin \theta$ and the moving amount $Y=\gamma \cos \theta$, the hitting position of the inner seal portion 30a against which the hot air from the hot air blowing small holes 8a hits, is moved in a circular locus.

Likewise, the hitting position of the inner seal portion 30a may be moved in an oval locus.

The first and second oscillating portions 27 and 28 compose an oscillating device.

The flat side heating portions 4 and 5 and the folded side heating portions 6 and 7 may be oscillated in the same manner as the inner peripheral heating portion 8.

Figure 3:
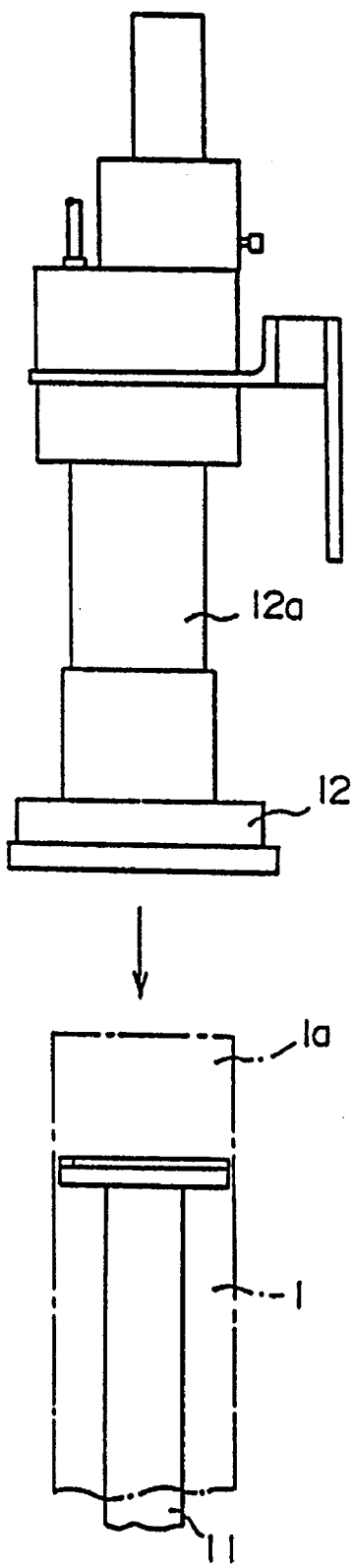
FIG. 3 is a front view showing principal portions of a seal heating apparatus for a bottom edge portion of a paper container.

Next, with reference to FIGS. 3 and 4, a seal heating apparatus for a bottom edge portion 1a of the paper container 1 will be described. The heating process of the bottom edge portion 1a is performed in the condition that the paper container 1 is not filled with the liquid measure (juice, liquor, or the like). The bottom edge portion 1a can be sealed in a cylinderically shaped state such that the bottom edge portion 1a does not have fold lines. In other words, a chamber portion 12 of a seal-heating apparatus 12a is lowered to the bottom edge portion 1a (denoted by a single-dotted line) which is held by a mandrel 11 so that the bottom edge portion 1a is covered by the chamber portion 12. In this state, the bottom edge portion 12 is heated. After the heating process is completed, the chamber portion 12 is raised and thereby the heating process is completed.

When the seal heating process is performed, it is necessary to relatively move the paper container 1 and the chamber portion 12. Thus, it is possible to raise and lower the bottom edge portion 1a of the paper container 1 so that the bottom edge portion 1a is inserted into and separated from the chamber portion 12.

Figure 4:
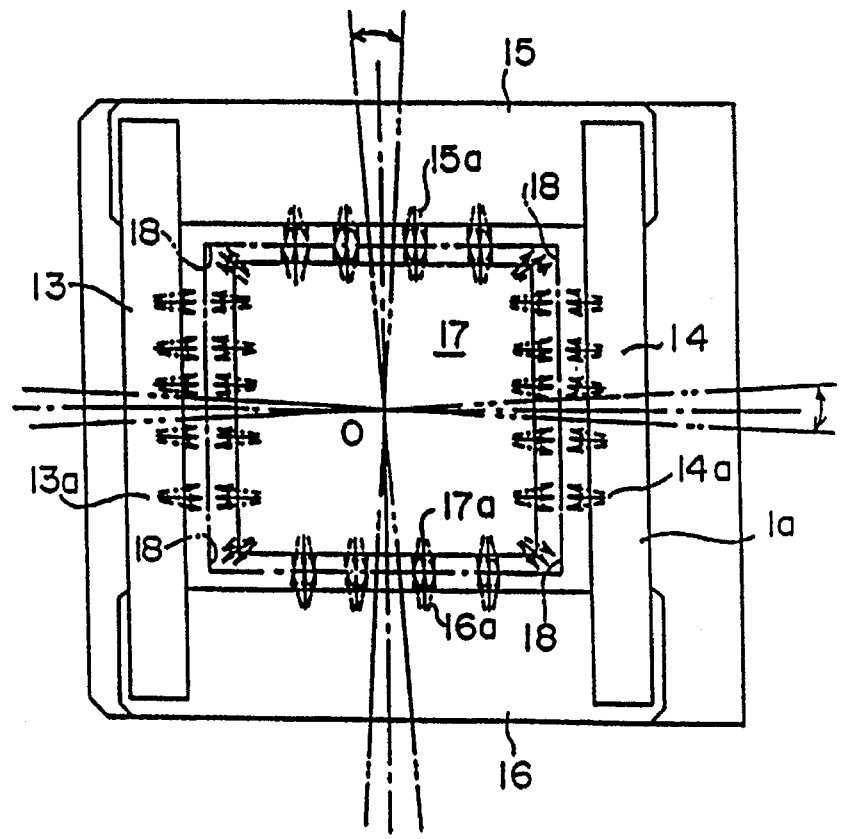
FIG. 4 is a schematic diagram showing the seal heating apparatus for the bottom edge portion.

The heating chamber portion 12 for the bottom edge portion 1a is shown in FIG. 4. Referring to FIG. 4, the heating chamber 12 accommodates a pair of first flat side heating portions 13 and 14, a pair of second flat side heating portions 15 and 16, and an inner peripheral heating portion 17. The first flat side heating portions 13 and 14 have many hot air blowing small holes 13a and 14a, respectively. The second flat side heating portions 15 and 16 have many hot air blowing small holes 15a and 16a, respectively. The inner peripheral heating portion 17 is formed in a rectangular shape, and has many hot air blowing small holes 17a.

As with the seal heating apparatus for the top edge portion 1b of the paper container 1, the inner peripheral heating portion 17 is oscillated by oscillating devices similar to those shown in FIGS. 5A and 5B. Thus, the direction of hot air blown from the many hot air blowing small holes 17a of the inner peripheral heating portion 17 can be varied, thereby fully and equally heating predetermined portions of the bottom edge portion 1a. In particular, hot air is fully and equally blown to four inner corners 18 of the bottom edge portion 1a as with other portions thereof.

Modifications of the seal heating apparatus for the bottom edge portion 1a, substitute means thereof, and modifications thereof are similar to those of the seal heating apparatus for the top edge portion 1b. Thus, their description is omitted.

As described above, according to the seal heating method for a paper container of the present invention, the inner seal portions of the open edge portion of the cylindrically shaped paper container face to the inner peripheral heating portion. The outer seal portions face the outer peripheral heating portions. As at least the inner peripheral heating portion is oscillated, hot air brown from the many hot air blowing small holes formed on the inner peripheral heating portion diffuses to the inner seal portions of the paper container, thereby equally heating the inner seal portions. Thus, the hot air equally hits the four inner corners of the paper container, thereby equally heating the inner seal portions to be bonded. In addition, the hot air blown from the hot air blowing small holes does not flow to narrow areas. Instead, the hitting position against which the hot air hits, can be moved. Thus, foams, burns, and pin holes due to spot heating can be prevented. In addition, since the seal portions to be bonded can be equally heated, seal defects can be prevented. Consequently, the paper container can be prevented from being broken and therefore the leaking of the liquid contents can be prevented.

Moreover, the seal-heating apparatus for a paper container of the present invention comprises the inner heating portion and outer peripheral heating portions. The shape of the inner peripheral heating portion corresponds to that of the inner seal portions of the cylindrically formed paper container. The shape of the outer peripheral heating portions corresponds to the shape of the outer seal portions of the paper container. The many hot air blowing small holes are formed in the inner peripheral heating portion and the outer peripheral heating portions. Hot air heated at a predetermined temperature is blown from the hot air blowing small holes to the seal portions of the paper container. As at least the inner peripheral heating portion can be oscillated by the oscillating device, the direction of the hot air blown from the hot air blowing small holes of the inner peripheral heating portion is varied. As a result, the hot air can be prevented from being blown to narrow areas. In addition, since the hot air is equally blown to four inner corners of the paper container, they can be equally heated. Thus, foams, burns, and pin holes due to spot-heating can be prevented. Moreover, since seal defects due to insufficient heating is prevented, the paper container can be prevented from being broken and the leaking of the liquid contents can be prevented.

Since the apparatus according to the present invention is constructed by simply providing the oscillating device, the cost of products can be reduced.

What is claimed is:

1. A heat-sealing method for sealing a cylindrically shaped paper container comprising the steps of:

providing a heat-sealing apparatus having an inner peripheral heating portion and outer peripheral heating portions, said inner peripheral heating portion being rotatable about an axial axes of rotation without contacting said outer peripheral heating portions;

aligning an inner seal portion of a seal portion formed at an open edge portion of said cylindrically shaped paper container which has not been assembled, to said inner peripheral heating portion of the seal-heating apparatus, and aligning said outer peripheral heating portion of the seal-heating apparatus; and blowing hot air through small hot air blowing holes formed in said inner peripheral heating portion to the inner seal portion while oscillating said inner peripheral heating portion about said axial axes of rotation over a predetermined oscillating angle, and while blowing hot air through small hot air blowing holes formed in said outer peripheral heating portions to the outer seal portion such that the outer seal portion is uniformly heat-sealed.

2. The heat-sealing method as set forth in claim 1, wherein the predetermined oscillating angle of said inner peripheral heating portion ranges from 0.3 degrees to 10 degrees.

3. The heat-sealing method as set forth in claim 1, wherein the inner peripheral heating portion is oscillated over a period ranging from 1 Hz to 20 kHz.

4. The heat-sealing method as set forth in claim 1, further comprising the step of controlling the inner peripheral heating portion to oscillate about an second axes of rotation perpendicular to said axial axes of rotation of said inner peripheral heating portion.

5. The heat-sealing method as set forth in claim 4, further comprising the step of controlling the inner peripheral heating portion to oscillate about both the axial axes of rotation of said inner peripheral heating portion and the second axes of rotation perpendicular to said axial axes of rotation so as to move in a circular locus hitting position of the inner seal portion against which hot air from the small hot air blowing hole of the inner peripheral heating portion contacts to uniformly heat the inner seal portion.

6. The heat-sealing method as set forth in claim 4, further comprising the step of controlling the inner peripheral heating portion to oscillate about both the axial axes of rotation of said inner peripheral heating portion and the second axes of rotation perpendicular to said axial axes of rotation so as to move in an oval locus hitting position of the inner seal portion against which hot air from the small hot air blowing hole of the inner peripheral heating portion contacts to uniformly heat the inner seal portion.

7. A heat-sealing apparatus for a paper container, for heat-sealing a cylindrically shaped paper container:

an inner peripheral heating portion oscillatably disposed in face to face aligned relationship with an inner seal portion of a seal portion formed at an open edge portion of the paper container which has not been assembled, said inner peripheral heating portion having small hot air blowing holes through which hot air is blown to contact and uniformly heat the inner seal portion;

an outer peripheral heating portion in face to face relationship with an outer seal portion of the seal portion, said inner peripheral heating portion having small hot air blowing holes through which hot air is blown to contact and uniformly heat the outer seal portion; and an oscillating device for oscillating the inner peripheral heating portion about an axial axes of rotation of said inner peripheral heating portion, over a determined oscillating angle, and without contacting said outer peripheral heating portions.

8. The seal-heating apparatus as set forth in claim 7, wherein said inner peripheral heating portion is oscillatable about said axial axes of rotation of said inner peripheral heating portion (8, 17), and wherein said oscillating device includes a first oscillating portion for oscillating said inner peripheral heating portion about said axial axes of rotation of said inner peripheral heating portion.

9. The seal-heating apparatus as set forth in claim 8, wherein said inner peripheral heating portion is further oscillatable about a second axes of rotation perpendicular to said axial axes of rotation of said inner peripheral heating portion, and wherein said oscillating apparatus includes a second oscillating portion for oscillating said inner peripheral heating portion about the second axes of rotation perpendicular to said axial axes of rotation of said inner peripheral heating portion.

10. The seal-heating apparatus as set forth in claim 9, further comprising a control device connected to said first and second oscillating portions, wherein the control device controls the first and second oscillating portions so as to move in a circular or oval locus hitting portion of the inner seal portion against which hot air from the small hot air blowing small holes (8a, 17a) of the inner peripheral heating portion (8, 17) contacts to uniformly heat the inner seal portion.

* * * * *